Feb. 26, 1952 J. W. MURRAY 2,586,978
INLAY FOR MOLDED PLASTIC ARTICLES
Filed Oct. 9, 1948 3 Sheets-Sheet 1

John William Murray
Inventor,
Haynes and Koenig,
Attorneys.

Feb. 26, 1952　　　　J. W. MURRAY　　　　2,586,978
INLAY FOR MOLDED PLASTIC ARTICLES
Filed Oct. 9, 1948　　　　　　　　　　　　3 Sheets-Sheet 2
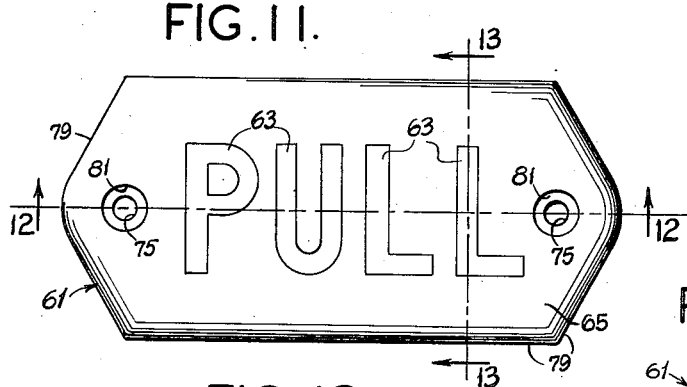
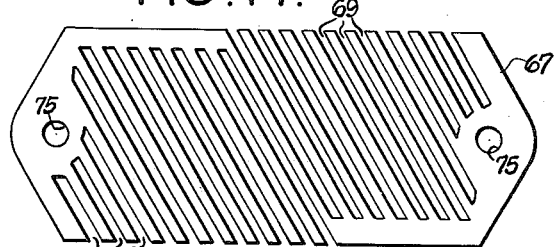
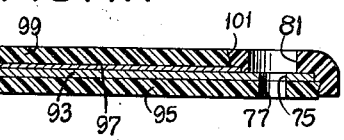
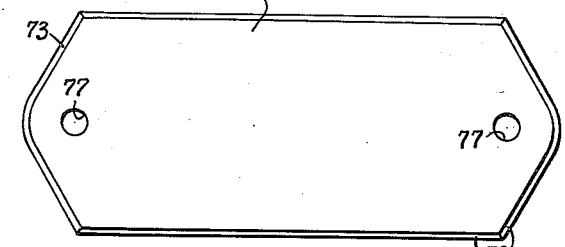
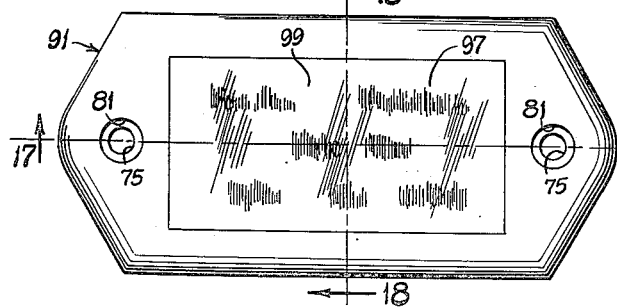

Feb. 26, 1952   J. W. MURRAY   2,586,978
INLAY FOR MOLDED PLASTIC ARTICLES
Filed Oct. 9, 1948   3 Sheets-Sheet 3
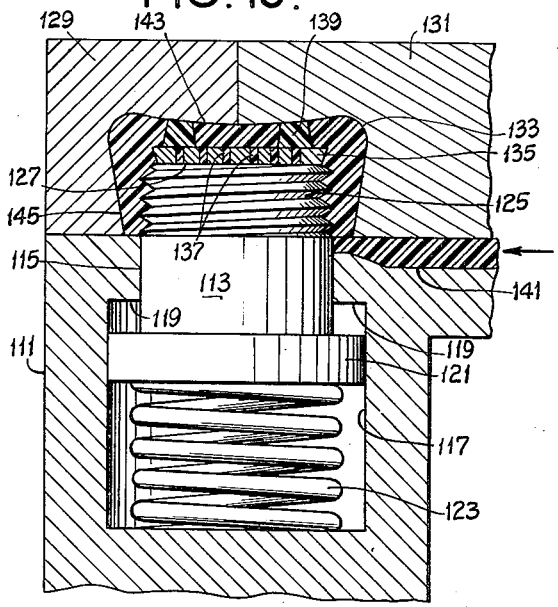
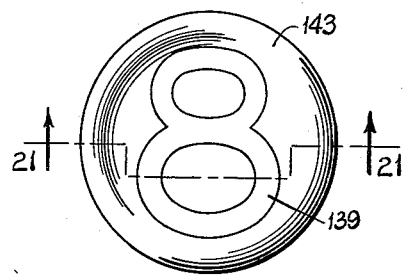
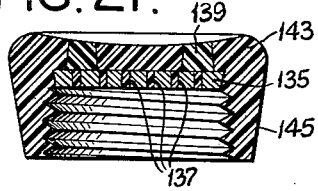
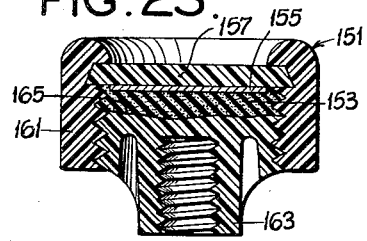
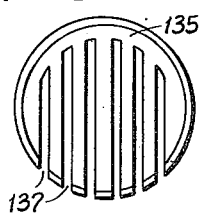
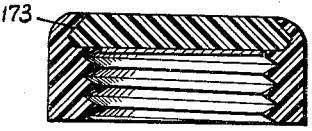
John William Murray,
Inventor,
Haynes and Koenig,
Attorneys.

Patented Feb. 26, 1952

2,586,978

UNITED STATES PATENT OFFICE 2,586,978

INLAY FOR MOLDED PLASTIC ARTICLES

John William Murray, Richmond Heights, Mo.

Application October 9, 1948, Serial No. 53,709

7 Claims. (Cl. 41—35)

This invention relates to molded articles and their manufacture, more particularly to injection-molded plastic articles having inlays or insets.

Among the several objects of the invention may be noted the provision of plastic articles, such as knobs, tags and signs, having indicative or decorative inlays or insets, which may be readily molded by injection molding; the provision of injection-molded articles of the class described wherein the inlays or insets are firmly secured in place within the bodies of the articles; and the provision of inlaid molded articles of this class wherein the plastic from which the articles are molded fills any apertures which there may be in the inlays. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a plan view illustrating one face of a molded tag of this invention;

Fig. 11 is a plan view of a sign embodying the invention;

Fig. 12 is a section taken on line 12—12 of Fig. 11;

Fig. 13 is a section taken on line 13—13 of Fig. 11;

Fig. 14 is a plan view of a core employed in the sign of Fig. 11;

Fig. 15 is a plan view of a backing plate of the sign of Fig. 11;

Fig. 16 is a plan view of an alternative embodiment of the sign;

Fig. 17 is a section taken on line 17—17 of Fig. 16;

Fig. 18 is a section taken on line 18—18 of Fig. 16;

Fig. 19 is a section through a mold illustrating the molding of a knob or cap embodying an alternative form of the invention;

Fig. 20 is a plan view of the cap or knob;

Fig. 21 is a section taken on line 21—21 of Fig. 20;

Fig. 22 is a plan view of a core embodied in the cap or knob of Figs. 19-21;

Fig. 23 is a section illustrating an alternative form of cap or knob, and showing a stem therefor; and Fig. 24 is a section illustrating a further alternative form of cap or knob.

Similar reference characters indicate corresponding parts throughout the several views of the drawings.

Figure 1:
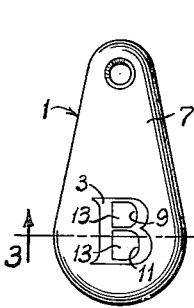
Figure 2:
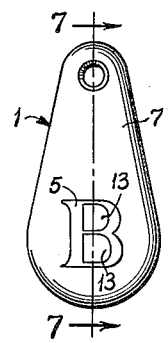
Fig. 2 is a plan view of the other face of the tag.
Figure 3:
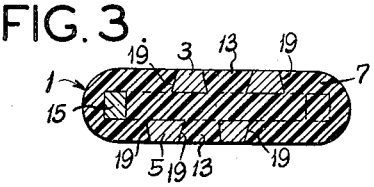
Fig. 3 is an enlarged section taken on lines 3—3 of Fig. 1.

Referring to the drawings, Figs. 1 and 2 illustrate respectively the two faces of a flat molded tag 1 of this invention having an inlay 3 in one face and another inlay 5 in its other face, the inlays being embedded in the molded body 7 of the tag. This tag, which is merely exemplary of various articles which may be made in accordance with the invention, may be used as a cord pull or key chain tag, for example. As shown, the inlays are pre-formed flat blanks of metal, for example, in the shape of letters of the alphabet, both inlays being illustrated as being of the shape of the letter B, and thus having openings 9 and 11 therethrough. The upper faces of the inlays are flush with the faces of the molded body of the tag. The material of which the body of the tag is molded fills the openings 9 and 11 in the inlays, as indicated at 13, so that the faces of the tag are wholly smooth and devoid of crevices (see particularly Fig. 3).

Figure 4:
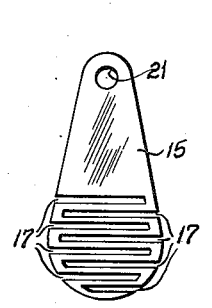
Fig. 4 is a plan view of a core which is embedded in the tag.
Figure 5:
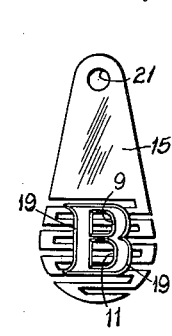
Fig. 5 is a plan view showing an inlay applied to the core of Fig. 4.
Figure 6:
Fig. 6 is an end view of the core of Fig. 4 with inlays applied to both faces thereof.

In making the tag, a core 15 (Fig. 4) which may have the same general outline as the tag, but must be at least somewhat smaller, is used. This core, which is a flat blank formed of flat sheet metal stock, for example, has slots 17 leading inward from its peripheral edge providing runners for flow of the plastic material from which the body 7 of the tag is molded. As shown in Figs. 4 and 5, each slot leads inward from one side of the core to a point just short of the other side of the core, with adjacent slots leading inward from the opposite sides of the core. The inlays 3 and 5 are peripherally formed for keying engagement with the molded body 7 of the tag so as to be firmly secured in place. As shown, the inlaid letters may have their edges (including the edges defining openings 9 and 11) beveled as indicated at 19 in such manner that the various sections of the letters are of wedge shape, converging from the bottom faces to the upper faces of the letters. The inlays 3 and 5 are applied flat against the faces of the core 15 in its slotted area, with their outlines wholly within the outline of the core, and secured thereto in proper position in any suitable way, as, for example, by soldering (Figs. 5 and 6). Where the inlays are type characters such as letters, as herein illustrated, it will be understood that the two are applied with their bottom faces against the core so that both will be in proper position for being viewed in the completed tag. The core 15 is illustrated as being provided with an opening 21 in its end for a purpose that will appear.

Figure 7:
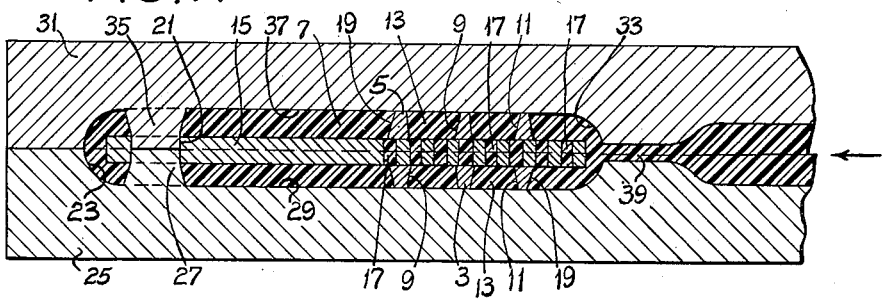
Fig. 7 is a section through a mold illustrating the molding of the tag, the tag being shown in section on line 7—7 of Fig. 2.

The core-inlay assembly of Figs. 5 and 6 is placed flatwise in the mold cavity 23 of the lower mold block 25 of an injection molding press Fig. 7). The cavity has the outline of the tag and, as shown, a depth equal to half the thickness of the tag. A pin 27 extends into the cavity from the block and enters the opening 21 in the core 15. It will be seen that the lowermost inlay (the inlay 3 as illustrated in Fig. 7) functions as a spacer to space the core above the bottom 29 of the cavity in the mold block. As illustrated, the depth of the cavity is such that the core is half within the cavity and half above the upper face of the mold block 25. After the core-inlay assembly has been so placed and centered in the cavity 23, the upper mold block 31 of the press, which has a mold cavity 33 of the same form as cavity 23, is brought into engagement with the lower mold block to close the mold. A pin 35 extending into the cavity 33 from the upper block 31 enters the opening 21 in the core 15. The bottom 37 of the cavity 33 engages the upper face of the upper inlay 5. Plastic molding material is then injected under pressure into the mold through its gate 39. The plastic material fills the mold and flows through the slots or runners 17 in the core 15 between the two inlays 3 and 5 to enter and fill the openings 9 and 11 in the inlays. After the molding material has set, the mold is opened, the molded tag stripped therefrom, and the waste molding material in the gate broken off. In the resultant tag, the core 15 is completely embedded in the molded body 7 of the tag and the faces of the inlays 3 and 5 are exposed at the faces of the tag. This is due to the engagement during the molding operation of the bottoms of the mold cavities with the faces of the inlays, which prevents molding material from flowing over said faces. The tag also has an aperture in its end where pins 27 and 35 extended into the opening in the core 15 during molding. The material of the body of the tag overlies the beveled edges of the inlays and thus securely keys them in place.

It will be understood that the inlays 3 and 5 and the core 15 may be made of material other than metal. They may be molded, for example, of any suitable plastic material. It will also be understood that the core 15 need not be completely slotted to provide runners. The latter may be provided by grooving the faces of the core rather than by forming slots completely through the core. What is important is that the core be formed to provide a passage or passages for flow of the plastic material between the inlays to the openings in the inlays so that the molding material may flow into and fill these openings. It is to be noted, however, that where the inlays are of such shape or form as to be devoid of any openings which are completely blocked off from the periphery of the inlay, as in the case of such letters as C, E, F, etc., the core need not be provided with runners. Also, it will be readily understood that only one inlay may be provided rather than two.

Figure 8:
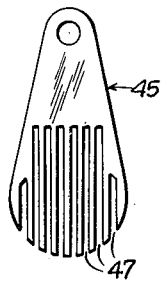
Fig. 8 is a plan view of an alternative form of core.

Fig. 8 illustrates an alternative form of core which may be substituted for the core 15 of Fig. 4. The core of Fig. 8, designated 45, has slots 47 extending into the core from the end thereof, rather than from opposite sides as in Fig. 4.

Figure 9:
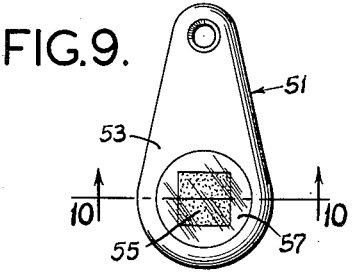
Fig. 9 is a plan view of one face of an alternative form of tag of this invention.
Figure 10:
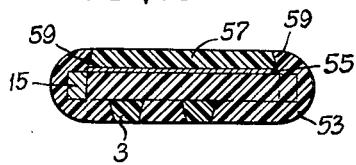
Fig. 10 is an enlarged section taken on line 10—10 of Fig. 9.

Figs. 9 and 10 illustrate an alternative embodiment of the invention wherein the tag, instead of having inlays in the shape of letters or the like on both sides, has a letter inlay on only one side and a transparent inlay (which may be colored, if desired) on the other side overlying a printed card, photograph or the like. The tag 51 of Fig. 10 is shown as comprising a core 15 having the inlay 3 applied to one face of the core, the core and inlay being embedded in the molded body 53 of the tag. Instead of having a letter or like inlay on the other side of the core, however, a thin, flat insert such as a printed card, photograph or the like 55 is applied to the other face of the core and covered by a disc or window 57 of transparent plastic, having a beveled edge 59 for keying purposes. It will be understood that the tag of Figs. 9 and 10 may be molded in the same manner as illustrated in Fig. 7.

Figs. 11-13 illustrate a sign 61 constituting a further embodiment of the invention. The sign has letter inlays 63 in one face thereof embedded in the molded body 65 of the sign. In making the sign, a core 67 having the same general outline as the sign, but somewhat smaller, is used. The core is slotted as indicated at 69 to have runners leading inward from its periphery. The letter inlays are secured to one face of the core to spell out the sign. A backing plate inlay 71 of plastic, metal or other suitable material, preferably having the same outline as the core and also having a beveled edge 73 for keying purposes, is applied to the other face of the core. The latter has apertures 75 therein in line with apertures 77 in the backing plate.

In molding the sign, the core-inlay-backing plate assembly is laid in the cavity of the lower mold block of a press similar to that illustrated in Fig. 7, being centered on pins which extend into the apertures 77 and 75. The upper mold block of the press is brought into engagement with the lower mold block to close the mold, the bottom of the cavity in the upper mold block engaging the upper face of the inlays 63. Larger pins extending from the upper mold block engage the upper face of the core 67 in line with the pins of the lower block extending into the apertures. Plastic molding material is then injected under pressure into the mold to fill the latter and flow around the inlays and through the runners in the core into the openings of any inlays which may have openings (such as the letter P illustrated in Fig. 11). In the resultant tag, the molded body 67 has a peripheral flange 79 forming a recess receiving the core 67 and the backing plate 71, the latter being inlaid and keyed by its beveled edge 73 to the flange to hold the parts assembled. The faces of the inlays are exposed in the face of the molded body due to the engagement of the bottom of the upper mold cavity with the faces of the inlays, thus preventing molding material from flowing over said faces. The resultant sign also has apertures 81 which are enlarged at the front face of the sign to function as screw holes to receive screws for attaching the sign.

Figs. 16–18 illustrate an alternative embodiment of the sign wherein instead of letter inlays there is provided a transparent inlay overlying a thin, flat insert such as a printed card or the like. The sign 91 of Figs. 16–18 is shown to comprise a core 93 and a backing plate 95 like the core 67 and backing plate 71 of Figs. 14 and 15 except that the core need not be slotted. A printed card 97 or the like is applied to one face of the core and the backing plate to the other. A front plate 99 of transparent plastic or the like and forming a window overlies the card. This plate has a beveled edge 101 for keying purposes. The core, backing plate, card and window assembly as molded in the same manner as the sign of Fig. 11.

Figs. 19–20 illustrate a knob or cap embodying the invention and the mode of molding same. At 111 in Fig. 20 is shown the lower mold block of an injection molding press. A plunger 113 is vertically slidable in a bore 115 in the block which is enlarged as indicated at 117 to provide internal shoulders 119. On the lower end of the plunger is a collar 121 engageable with the shoulders to limit upward movement of the plunger. The latter is biased toward the shoulders or stops 119 by a spring 123 in the enlargement of the bore. The plunger may be threaded at its upper end, as indicated at 125. Its upper end is flat as indicated at 127 to serve as a bed. At 129 and 131 are shown the two parts of the upper mold block of the press which when brought together provide a mold cavity 133 defining the external form of the knob or cap to be molded.

At 135 is shown a core in the shape of a beveled-edge disc and having slots 137 leading inward from its periphery to provide runners for flow of plastic molding material (see Fig. 22). As shown in Figs. 19–21, a beveled-edge inlay 139, specifically a blank shaped like the numeral "8," is applied to one face of the core and secured thereto in any suitable way. The core-inlay assembly is laid on the upper end of the plunger, core down and inlay up. The two parts 129 and 131 of the upper mold block are then brought together and into engagement with the lower mold block to close the mold. The bottom of the cavity 133 in the upper mold block engages the upper face of the inlay numeral and drives the plunger 113 to the position shown in Fig. 19. As shown, the upper screw-threaded end of the plunger extends into the cavity 133, being spaced from the side wall of the cavity.

Plastic molding material is then injected under pressure through the gate 141 of the mold. It fills the space within the mold cavity 133 surrounding the plunger 113 and the inlay 139. It flows through the runners 137 in the core to fill the openings in the inlay. When the molding material has set, the parts of the mold are separated, and the molded knob or cap is unscrewed from the upper end of the plunger, the waste material in the gate being broken off. The resultant knob or cap, as illustrated in Figs. 20 and 21, is of cup-shape having a head portion 143 and an internally threaded annular flange portion 145. The core 135 is keyed within the cup under the head portion by its beveled edge. The inlay 139 overlies the core and is embedded in the head portion, with its face exposed at the face of the head portion. It is also keyed in place by its beveled edges. The molding material fills the openings in the inlay and the face of the head portion is therefore devoid of crevices.

Fig. 23 illustrates an alternative embodiment of the knob or cap wherein instead of a type inlay such as the numeral "8" there is provided a transparent inlay overlying a thin, flat insert such as a printed card or the like. The knob or cap 151 of Fig. 23 is shown to comprise a core 153, preferably made of rubber in this instance. On this core is placed a printed card 155 or the like and over the card is placed a beveled-edge disc or window 157 of transparent plastic having a beveled edge 159. This assembly has the body of the knob or cap molded thereon in much the same manner as in Fig. 19 except that the two parts of the upper mold block are formed to have a circular boss which engages the upper face of the window during molding to prevent molding material form flowing over the window. In the resultant knob or cap, the core and window are peripherally keyed within the internally threaded tubular molded body 161 of the knob or cap adjacent its upper end, with the card retained between the core and window under the latter.

Fig. 23 also illustrates the knob or cap as threaded on a molded plastic stem 163. An advantage of having the core 153 of rubber is that it provides for a tight fit of the stem against the face of the core even though the stem has shrunk in molding it. Such shrinkage may occur at the upper end face of the stem, which is indicated at 165 to be irregular as a result of shrinkage. It will be seen that when the stem is threaded into the knob or cap, it may be threaded far enough to compress the rubber core and deform the latter to provide an airtight seal therebetween.

In respect to the knob or cap of Fig. 23, it will be understood that the rubber core may be omitted, using only the card 155 under the window. Or a decalcomania may be applied to the undersurface of the window. In some instances where the plastic of which the window is composed will not bond with the plastic of which the sleeve 161 is molded, the edge of the window should be tapered rather than beveled to provide a better mechanical interlock. Such a construction is illustrated in Fig. 24, wherein the taper of the edge of the window is indicated at 173. It is preferable that the taper be such that the diameter of the upper face of the window is less than the diameter of the lower face of the window.

In view of the above, it will be seen that the several objects of the invention are achieved and other advantageous results attained.

As many changes could be made in the above constructions without departing from the scope of the invention, it is intended that all matter contained in the above descripion or shown in the accompanying drawings shall be interpreted as illustrative and not in a limiting sense.

I claim:

1. An inlaid molded article comprising a flat core formed with runners for flow of plastic molding material leading inward from an edge of the core, an inlay constituted by a part separate from the core and secured to one face of the core with its outline wholly within the outline of the core, the inlay having an opening therethrough leading to at least one of the runners, and a molded body embedding the core and peripherally surrounding the inlay with the outer face of the latter exposed at the corresponding face of the body, and including molding material filling the runners and the opening in the inlay, the core having an outline corresponding to but slightly smaller than the outline of the body.

2. An inlaid molded article comprising a flat core having an area in which it is traversed by slots extending inward from the periphery of the core, an inlay constituted by a part separate from the core and secured to one face of the core in its slotted area with the outline of the inlay wholly within the outline of the core, the inlay having an opening leading therethrough from its outer face to at least one slot in the core, and a molded body embedding the core and peripherally surrounding the inlay with the outer face of the latter exposed at the corresponding face of the body, and including molding material filling the slots in the core and the opening in the inlay, the core having an outline corresponding to but slightly smaller than the outline of the body.

3. An inlaid molded article comprising a flat core having an area in which it is traversed by slots extending inward from the periphery of the core, inlays constituted by parts separate from the core secured on opposite faces of the core, the outlines of the inlays being wholly within the outline of the core, at least one of said inlays having an opening leading therethrough from its outer face to at least one slot in the core, and a molded body embedding the core and peripherally surrounding the inlays with the outer faces of the latter exposed at opposite faces of the body, and including molding material filling the slots and the said opening in said one inlay, the core having an outline corresponding to but slightly smaller than the outline of the body.

4. An inlaid molded article as set forth in claim 3 wherein said inlays have their peripheries beveled for peripherally keying them to the molded body of the article.

5. An assembly for use in molding inlaid articles comprising a core consisting of a flat blank having runners leading inward from the periphery thereof for flow of plastic molding material, and an inlay blank constituted by a part separate from the core affixed to one face of the core over the runners, the outline of the inlay blank being wholly within the outline of the core.

6. An assembly for use in molding inlaid articles comprising a core consisting of a flat blank having an area traversed by slots leading inward from its periphery, and inlays constituted by parts separate from the core affixed to opposite faces of the core, at least one of which inlays has an opening therethrough leading from its outer face to a slot in the core, the outlines of the inlays being wholly within the outline of the core.

7. An inlaid molded article comprising a core consisting of a flat blank having an area traversed by slots leading inward from its periphery, inlays consisting of separate flat blanks in the shape of type characters affixed to opposite faces of the core in its slotted area, the outlines of the inlays being wholly within the outline of the core, and a molded body embedding the core and peripherally surrounding the inlays with the outer faces of the latter exposed, and including molding material filling the slots in the core and any openings there may be in the inlays, the core having an outline corresponding to but slightly smaller than the outline of the body.

JOHN WILLIAM MURRAY.

REFERENCES CITED

The following references are of record in the file of this patent:

UNITED STATES PATENTS

| Number | Name | Date |
|---|---|---|
| 272,033 | Edge | Feb. 13, 1883 |
| 760,191 | Gaylord | May 17, 1904 |
| 1,909,892 | Pope | May 16, 1933 |
| 2,120,553 | Flader | June 14, 1938 |
| 2,173,186 | Swartz et al. | Sept. 19, 1939 |
| 2,241,180 | Burke | May 6, 1941 |
| 2,285,963 | Gits | June 9, 1942 |

FOREIGN PATENTS

| Number | Country | Date |
|---|---|---|
| 521,056 | Great Britain | May 10, 1940 |